United States Patent [19]
Kim

[11] Patent Number: 5,187,590
[45] Date of Patent: Feb. 16, 1993

[54] LUMINANCE SIGNAL RECORDING CIRCUIT AND METHOD FOR MAINTAINING COMPATIBILITY IN REPRODUCING BETWEEN DIFFERENT VIDEO SYSTEMS

[75] Inventor: Yong-je Kim, Kyunggi, Rep. of Korea

[73] Assignee: Samsung Electronics Co., Ltd., Suwon, Rep. of Korea

[21] Appl. No.: 737,688

[22] Filed: Jul. 30, 1991

[30] Foreign Application Priority Data

Oct. 31, 1990 [KR] Rep. of Korea .................... 90-17584
Jul. 22, 1991 [KR] Rep. of Korea .................... 91-12545

[51] Int. Cl.$^5$ ............................................. H04N 5/76
[52] U.S. Cl. ..................................... 358/335; 358/330; 358/310; 358/21 R
[58] Field of Search ............... 358/310, 330, 335, 327, 358/21 R, 31, 11, 133, 12

[56] References Cited

U.S. PATENT DOCUMENTS 4,621,286 11/1986 Reitmeier et al. ................... 358/141
4,831,463 5/1989 Faroudja ............................. 358/310

*Primary Examiner*—Tommy P. Chin
*Assistant Examiner*—Robert Chevalier
*Attorney, Agent, or Firm*—Robert E. Bushnell

[57] ABSTRACT

An improved adaptive folding circuit for a video signal recording/reproducing system. The improved adaptive folding circuit has an adaptive emphasis circuit and an adaptive deemphasis circuit for receiving a luminance signal. The adaptive emphasis circuit includes a horizontal high pass filter for filtering the luminance signal and a horizontal low pass filter for filtering the luminance signal. A level detector is provided to receive the output of the horizontal high pass filter, the output of the level detector being provided to a look-up-table. A soft switch is controlled by the output of the look-up-table to provide for output of a proper mixture of the outputs of the horizontal high pass filter and/or the horizontal low pass filter. The adaptive deemphasis circuit attenuates the high frequency luminance level and outputs an adaptively deemphasized luminance signal to a modulator for modulation according to a modulation frequency Ff. An adder receives the outputs of the soft switch and the modulator and provides an improved adaptively folded luminance signal for output through a low pass filter and digital-to-analog converter.

6 Claims, 3 Drawing Sheets

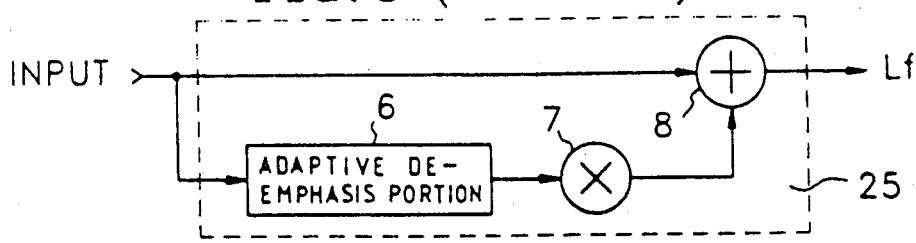
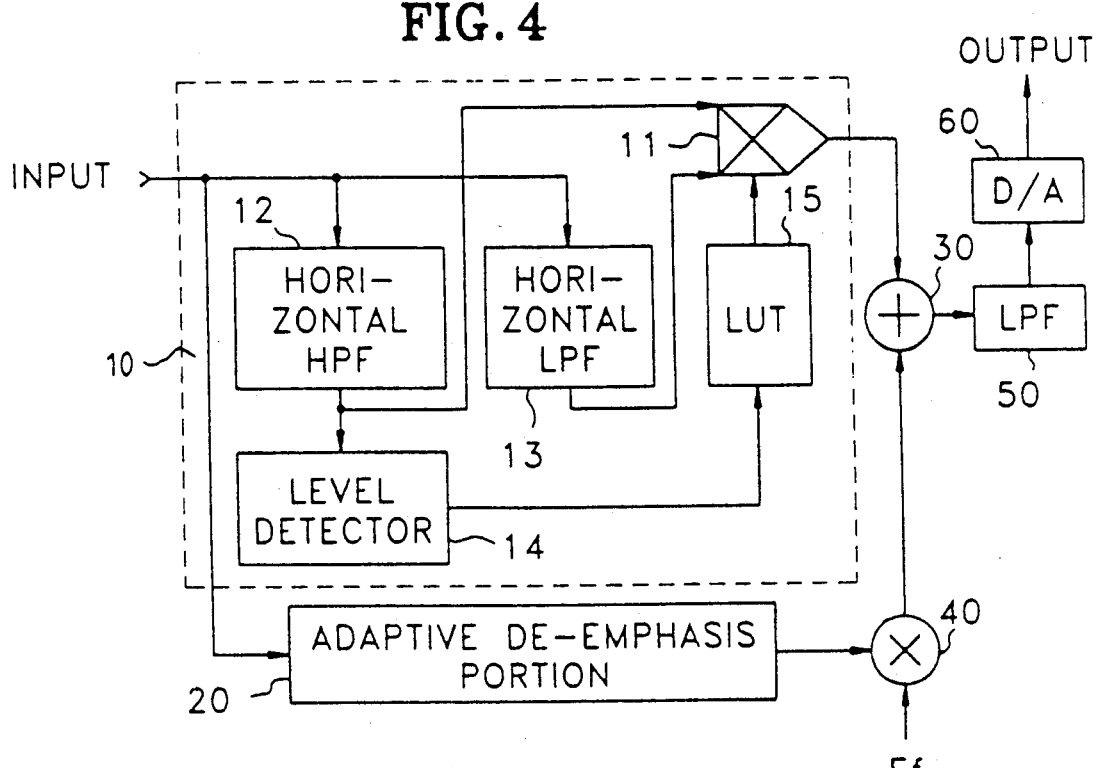
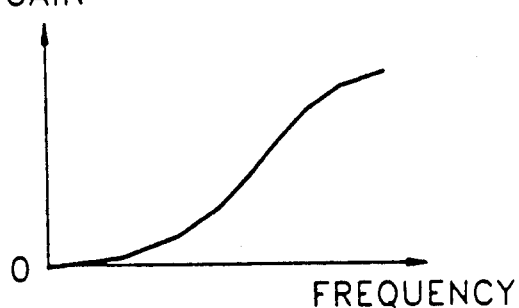

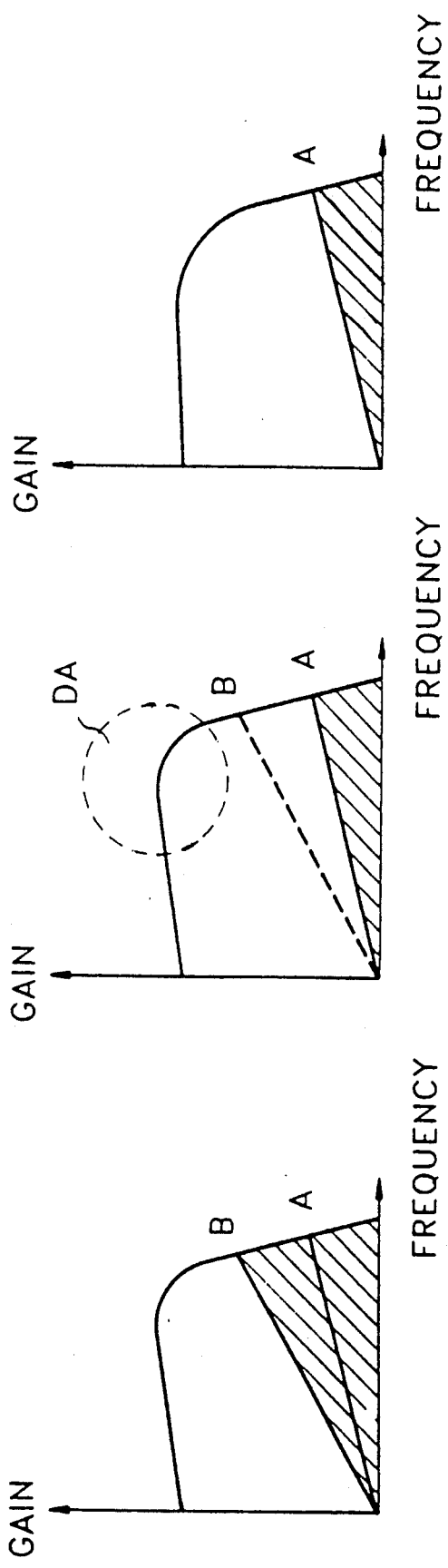

LUMINANCE SIGNAL RECORDING CIRCUIT AND METHOD FOR MAINTAINING COMPATIBILITY IN REPRODUCING BETWEEN DIFFERENT VIDEO SYSTEMS

BACKGROUND OF THE INVENTION

This invention relates to a video signal recording circuit and the method adapted for maintaining a compatibility in reproducing between different video systems. More particularly, this invention relates to a luminance signal recording circuit and the method which is applied to the invention tilted "Improved video signal recording system" and disclosed in U.S. patent application Ser. No. 07/569,029, and filed Aug. 17, 1990 now U.S. Pat. No. 5,113,262, and adapted for compatibly reproducing a luminance signal from a video tape recorded by one improved video signal recording system in the order existing video signal recording/reproducing system.

The existing video signal recording/reproducing apparatus for home use records one video signals on a video cassette tape using one of several video signal recording/reproducing systems. Conventional video home systems(hereinafter referred to as standard VHS system) have insufficient horizontal resolution, leading to degradation of the picture quality. Generally, the improved VHS method referred to as super VHS(S-VHS) records or reproduces video signals of the full bandwidth on or from the video cassette tape and provides an improved image quality.

Such systems require good quality tapes and recording/reproducing apparatus. However, the above S-VHS system is incompatible with a video cassette tape recorder(hereinafter referred to as a VCR) of the standard VHS system. VCR of the S-VHS system is able to reproduce video tapes recorded by both the S-VHS and the standard VHS systems, but VCR of the standard VHS system is unable to reproduce video signals recorded by the S-VHS system.

Therefore, the above U.S. patent application Ser. No. 07/569,029 discloses an improved video signal recording system designed to provide a compatibility with the standard VHS system by obviating such conventional disadvantages as described above.

Especially, in the above system, when the adaptively folded signal passes through the pre-emphasis unit connected to the rear of the encoder, the folded high frequency components are emphasized along with the non-folded high frequency signal. Further, during reproducing such emphasized signals by conventional video signal recording/reproducing apparatuses, there is the disadvantage of degradation of the picture quality if a de-emphasizing process is not carried out exactly.

In other words, if the high frequency luminance components adaptively folded into the low frequency luminance components are amplified along with the non-folded high frequency luminance components as above, when reproducing the video signals by general video signal recording/reproducing apparatus, artifacts such as dot crawl are generated on the screen, lowering the quality of the image.

SUMMARY OF THE INVENTION

Accordingly, it is an object of this invention to provide a luminance signal recording circuit and the method in a video signal recording/reproducing apparatus for reproducing video signals recorded by one improved video signal recording/reproducing system, by conventional video signal recording/reproducing systems without degradation of image quality.

It is another object of this invention to provide a luminance signal recording circuit and the method for maintaining a compatibility during reproducing between different video signal recording/reproducing systems, which may attenuate high frequency noise introduced on magnetic recording media.

To accomplish the above objects, there is provided a luminance signal recording circuit in a video signal recording/reproducing apparatus including an adaptive folding portion for adaptively folding high frequency luminance components within video signals into low frequency luminance components thereof, in order to record the video signals of a full bandwidth on a recording medium having a predetermined limited bandwidth and for recording the adaptively folded luminance signal along with a frequency folding information on the recording medium, said adaptive folding portion comprising:

an adaptive emphasis portion for adaptively emphasizing and outputting the luminance signal in accordance with a level of a high frequency signal included in the luminance signal;

an adaptive de-emphasis portion for attenuating the level of the high frequency signal in the luminance signal;

a modulator for modulating the adaptively de-emphasized luminance signal in accordance with a modulating frequency;

an adder for adding the luminance signal output from the adaptive emphasis portion and the de-emphasized signal output from the adaptive de-emphasis portion; and a low-pass filter for filtering frequency components adapted to record the frequency folded luminance signal on the recording medium.

There is also provided a luminance signal recording method in a video signal recording/reproducing apparatus for adaptively folding high frequency luminance components of luminance signals into low frequency luminance components thereof within the video signals and recording the folded video signal along with a frequency folding information on a recording medium, in order to record the video signals of a full bandwidth on a recording medium having a predetermined limited bandwidth, said adaptively frequency folding procedure comprising the steps of:

inputting a luminance signal separated from a composite video signal;

emphasizing and outputting adaptively the inputted luminance signal adaptively according to a level of a high frequency luminance signal of the inputted luminance signal;

attenuating the level of the high frequency of the inputted luminance signal;

modulating the attenuated luminance signal in accordance with a modulated frequency;

adding the emphasized luminance signal and the modulated luminance signal; and filtering frequency components adapted to record the frequency folded luminance signal on the recording medium.

BRIEF DESCRIPTION OF THE DRAWINGS

FIG. 3 is a detailed block diagram of the adaptive folding portion of the circuit shown in FIG. 2.

FIG. 4 is a detailed block diagram of an adaptive folding portion of the luminance signal recording circuit according to this invention.

FIG. 5 shows an output waveform diagram of the look-up table of the adaptive folding portion shown in FIG. 4.

FIG. 6 is a waveform diagram showing the output of a signal recorded by the conventional luminance signal recording circuit shown in FIG. 1.

FIG. 7A is a waveform diagram showing the output of a signal recorded using a frequency folding method by the adaptive frequency folding portion according to this invention.

FIG. 7B is a waveform diagram showing a normal output without degradation of high frequency bands when reproducing such a signal as represented by the waveform shown in FIG. 7A by a general video signal recording/reproducing system.

DETAILED DESCRIPTION OF THE INVENTION

A preferred embodiment of a luminance signal recording circuit of this invention for maintaining a compatibility in reproducing between different video signal recording/reproducing systems is described in detail below with reference to the accompanying drawings.

Before describing an improved luminance signal recording circuit for maintaining compatibility according to this invention, a brief description of a conventional luminance signal recording circuit will be given.

Figure 1:
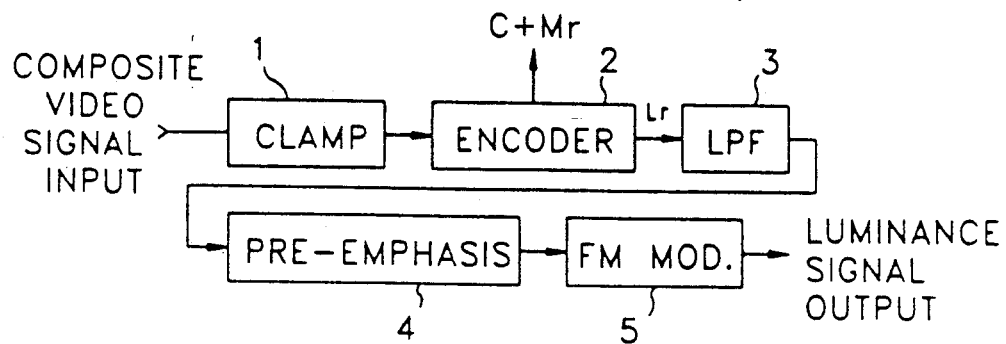
FIG. 1 is a block diagram of a luminance signal recording circuit in a conventional video signal recording/reproducing system.

FIG. 1 is a block diagram of a luminance signal recording circuit in a conventional video signal recording/reproducing system, where the composite video signal passes through an automatic gain control circuit not shown in the figure and clamp circuit 1, and is inputted to encoder 2.

The encoder 2 receives standard video signals of a full bandwidth, for example, NTSC signals, and generates chrominance/motion mixture signals C+Mr and a luminance signal Lr. The luminance signal Lr outputted from the encoder 2 passes through a low pass filter 3, and is pre-emphasized at pre-emphasis unit 4. The signal output from pre-emphasis unit 4 is FM modulated and outputted at the FM modulator 5. FM modulator 5 outputs the FM modulated signal to a recording head (not shown).

In FIG. 1, for the sake of the convenience of description, the processing path of chrominance signals is omitted and only the processing path of luminance signals is shown.

Figure 2:
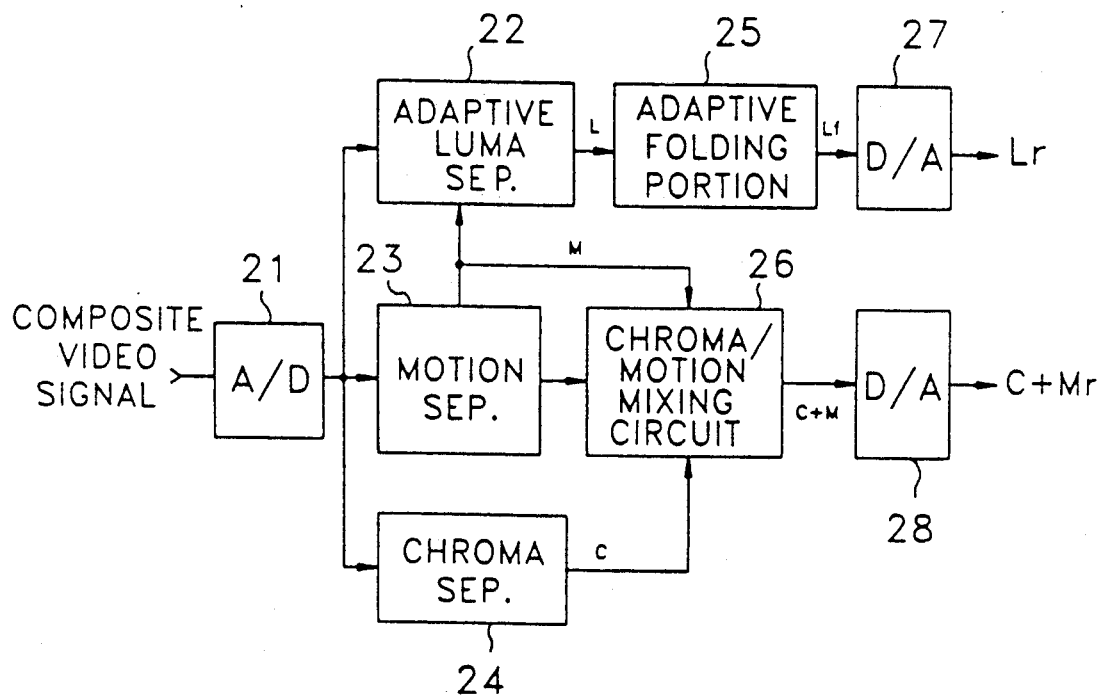
FIG. 2 is a detailed circuitry diagram of the encoder of the circuit shown in FIG. 1.

FIG. 2 is a detailed circuitry diagram of the encoder 2 of the circuit shown in FIG. 1.

As shown in FIG. 2, when a composite video signal is inputted, it is converted to a digital signal by the A/D converter 21. The digital converted signal is separated into the luminance signal L, the motion signal M, and the chrominance signal C at the adaptive luminance signal separator 22, the motion signal separator 23 and the chrominance signal separator 24, respectively.

In FIG. 2, the luminance signal L separated in the adaptive luminance signal separator 22 is folded in adaptive folding portion 25 to be described hereafter, and then is converted into analog signal Lr in D/A converter 27. D/A converter 27 outputs the analog converted signal Lr. The analog converted signal Lr from D/A converter 27 passes through a low-pass filter 3 connected to the post-stage of the encoder 2. The high frequency components of the analog converted luminance signal is pre-emphasized in the pre-emphasis portion 4. The chrominance signal C and motion signal M separated as described above are mixed with each other in chrominance/motion signal mixture circuit 26, and are converted into analog signal C+Mr in D/A converter 28.

Also, if the adaptively folded signal by a conventional adaptive folding portion 25 comprising an adaptive de-emphasis unit 6, a modulator 7 and an adder 8 as shown in FIG. 3 passes through the pre-emphasis unit 4 connected to the rear of the low-pass filter 3, the folded high frequency components as well as the non-folded high frequency components are simultaneously emphasized. That is, as shown in FIG. 6, the folded high frequency components are emphasized so that the gain of the signal moves form the original value A to the increased value B. Therefore, when a magnetic recording medium recorded under these circumstances is reproduced by a conventional standard video signal reproducing system, degradation of image quality is brought about if exact de-emphasis is not carried out.

To remove the conventional disadvantages stated above, an adaptive folding portion according to this invention as shown in FIG. 4 comprises an adaptive emphasis portion 10, an adaptive de-emphasis portion 20, and adder 30, a modulator 40, a low pass filter 50 and a D/A converter 60. The adaptive emphasis portion 10 comprises a soft switch 11 for regulating the amount of mixture of the luminance signal components according to the high frequency luminance signal components level of the inputted luminance signal components, a horizontal high pass filter 12 for passing horizontal high frequency components included in the luminance signal components, a horizontal low pass filter 13 for passing horizontal low frequency components in the luminance signal components, a level detector 14 connected to the horizontal high pass filter 12 and for detecting components greater than a predetermined magnitude in the high frequency components outputted from the horizontal high pass filter 12, and a look-up table 15 connected to the level detector 14 and for emphasizing only high frequency components included in the non-folded signal. In FIG. 4, the adaptive de-emphasis portion 20 is used to attenuate the high frequency luminance level. Also, the adder 30 is for adding the luminance signal from the adaptive emphasis portion 10 and the modulated luminance signal outputted from the modulator 40. The modulator 40 is for modulating the adaptively de-emphasized luminance signal from the adaptive de-emphasis portion 20 according to the modulation frequency Ff, and the low pass filter 50 is for passing only frequencies used in recording the frequency folded luminance signal on a specified recording medium. Next, the signal outputted from the low pass filter 50 is converted into an analog signal by the D/A converter 60 and is outputted.

The operation of a circuit according to this invention constituted as stated above is described below.

A circuit according to this invention differs from the conventional circuit shown in FIG. 1 in that the adaptive emphasis portion 10 and the low pass filter 50 are connected to the pre-stage of the D/A converter 60 and are operated as digital signals, and the magnitudes of the adaptively folded high frequency components is adjusted, and at the same time, the magnitude of the original signal is changed in accordance with the high frequency components and their magnitudes. Therefore, the only non-folded components of the luminance signal is changed, and when the video signal is reproduced in the conventional video signal recording/reproducing apparatus, the signal passes through the de-emphasis portion included in the apparatus. Accordingly, artifact effects on the screen which might be generated due to adaptively folded high frequency components are reduced. Also, because the luminance signal is processed as a digital signal and not as the analog signal as in the conventional circuit, exact pre-emphasis can be carried out.

Therefore, when the luminance signal passes through the horizontal high pass filter 12 for extracting high frequency luminance components of the non-folded signal and the level detector 14 for detecting the level of the high frequency luminance signal and is inputted to the look-up table 15 for emphasizing the input waveform according to a predetermined proportional coefficient, the look-up table 15 outputs a waveform as shown in FIG. 5 to the soft switch 11 according to a predetermined proportional coefficient.

Next, as shown in FIG. 4 the soft switch 11 mixes an amount of the luminance signal from the horizontal low pass filter 13 and an amount of the luminance signal from the horizontal high pass filter 12 according to the signal level of the output waveform of the look-up table 15 as shown in FIG. 5, and outputs the result to the adder 30.

That is, in FIG. 4, when the luminance signal separated in the adaptive luminance signal separator 22 is inputted to the adaptive folding portion 25 of FIG. 2, the input signal is outputted at the adder 30 in a form in which high frequency components are adaptively emphasized by the adaptive emphasis portion 10 which regulates the amount of high frequency components according to the frequency and level, and the signal is added to the folded high frequency components outputted through the adaptive de-emphasis portion 20 and the modulator 40 and is outputted in the form of the waveform as shown in FIG. 7A.

In other words, as shown in FIG. 7A, the luminance signal emphasized by the adaptive emphasis portion 10 is emphasized to portion A, and the amount of emphasis of the folded signal is reduced as compared with the conventional waveform, shown in FIG. 6.

Therefore, the adaptive folding portion 25 used in the circuit of this invention, processes the non-folded signal, to generate the signal having its specified high frequency components emphasized and the signal having its gain reduced be folding its high frequency components into a low frequency components and mixes the resultant signals. Accordingly, when reproducing the signals in a conventional video signal recording/reproducing system, although characteristics of the de-emphasis portion 20 included in the system are lowered, degradation of image quality due to the folded high frequency components is prevented.

In other words, because the signal having passed through the adaptive emphasis portion 10 according to this invention has high frequency components emphasized as indicated by the portion DA of FIG. 7A, the signal is passed through the de-emphasis portion 20 included in the video recording/reproducing system disclosed in the aforesaid U.S. patent application No. 07/569,029 when the signal recorded in such a manner as described above is reproduced by the above-mentioned video recording/reproducing system. As a result, the signal can be restored into the original normal video signal as shown in FIG. 7B. On the other hand, when the signal recorded in such a manner as described above is reproduced by the conventional video recording/reproducing system, the signal is passed through the conventional de-emphasis portion, so that the adpatively folded signal becomes below a portion A of FIG. 7B. As a result, the signal can be reproduced without deterioration of the picture quality and with the compatibility between the different systems.

The adaptive emphasis portion 10 included in the adaptive folding portion 25 of this invention has a constitution basically similar to conventional adaptive de-emphasis circuits, and output waveforms are differed by setting the proportional coefficients differently in the look-up table.

Also, when a video signal is recorded by adaptive emphasis according to this invention, even if a noise is introduced and recorded on the magnetic recording medium, a high frequency noise is attenuated at the de-emphasis portion of the reproducing terminal, and in effect, reduces the noise automatically.

What is claimed is:

1. An adaptive folding circuit for use in a luminance signal recording circuit for maintaining compatibility of reproduction between different video systems in a video signal recording/reproducing apparatus, said adaptive folding circuit for adaptively folding high frequency luminance components of a video signal into low frequency luminance components, in order to record the video signals of a full bandwidth on a recording medium having a predetermined limited bandwidth and to record an adaptively folded luminance signal along with frequency folding information on the recording medium, said adaptive folding circuit comprising:

adaptive emphasis means for emphasizing luminance signal components of said video signal in in response to a level of a high frequency luminance signal component of the luminance signal components to output an emphasized luminance signal;

adaptive de-emphasis means for attenuating a high frequency luminance signal level of the luminance signal to output an adaptively de-emphasized luminance signal;

a modulator for modulating the adaptively de-emphasized luminance signal in response to a modulation frequency signal;

an adder for providing an adaptively folded luminance signal by adding the emphasized luminance signal output from the adaptive emphasis means and the adaptively de-emphasized luminance signal output from the adaptive de-emphasis means; and low-pass filter means for filtering said adaptively folded luminance signal for recording on the recording medium.

2. An adaptive folding circuit as claimed in claim 1, wherein said adaptive emphasis means comprises:

horizontal high pass filter means for passing horizontal high frequency luminance signal components of said luminance signal components;

horizontal low pass filter means for passing horizontal low frequency luminance signal components of said luminance signal components;

level detector means connected to the horizontal high pass filter means for detecting said high frequency luminance signal components having a magnitude greater than a specified amplitude;

look-up table means connected to an output of the level detector means for outputting a control signal to emphasize only high frequency components in the luminance signal components; and soft switch means for receiving said output horizontal high frequency luminance signal components of the horizontal high pass filter and said output horizontal low frequency luminance signal components of the horizontal low pass filter, and for outputting a mixture of the horizontal high and low frequency luminance signal components according to said control signal supplied from the look-up table, for input to said adder as said emphasized luminance signal.

3. The adaptive folding method as claimed in claim 1, wherein said adaptive emphasizing step further comprises the steps of:

horizontal high pass filtering said luminance signal for outputting horizontal high frequency luminance signal componenents of said luminance signal;

horizontal low pass filtering said luminance signal for outputting horizontal low frequency luminance signal components of said luminance signal;

detecting output high frequency luminance signal components, of said output high frequency luminance signal components, having a magnitude greater than a specified magnitude;

outputting a control signal from a look-up table in response to a results of said detecting step; and adjusting a mixture of the horizontal high and low frequency luminance signal components according to said control signal supplied from the look-up table to output an emphasized luminance signal wherein only the high frequency luminance signal components are emphasized.

4. A method for adaptive folding a luminance signal for use in a recording circuit for maintaining compatibility in reproducing between different video systems in a video signal recording/reproducing apparatus, for adaptively folding high frequency luminance components of a video signal into low frequency luminance components thereof, in order to record the video signals of a full bandwidth on a recording medium having a predetermined limited bandwidth and for recording an adaptively folded luminance signal along with frequency folding information on the recording medium, said adaptive folding method comprising the steps of:

adaptively emphasizing the luminance signal in accordance with a level of a high frequency luminance signal component of the luminance signal to output an emphasized luminance signal;

attenuating a high frequency luminance signal level of the luminance signal to output an adaptively de-emphasized luminance signal;

modulating the adaptively de-emphasized luminance signal in response to a modulation frequency signal;

adding the emphasized luminance signal and the adaptively de-emphasized luminance signal for generating an adaptively folded luminance signal; and a low-pass filtering frequency components of said adaptively folded luminance signal.

5. The process of claim 4, further comprised of providing said emphasized luminance signal by emphasizing only high frequency components of said luminance signal components of the video signal.

6. The process of claim 4, further comprised of providing said emphasized luminance signal by emphasizing only high frequency components of said luminance signal components of the video signal without emphasizing adaptively folded high frequency components.

* * * * *